US012377019B2

(12) United States Patent
Henke et al.

(10) Patent No.: US 12,377,019 B2
(45) Date of Patent: Aug. 5, 2025

(54) STERILE CONTAINER

(71) Applicant: Aesculap AG, Tuttlingen (DE)

(72) Inventors: Matthias Henke, Villingen-Schwenningen (DE); John Wallace, East Jordan, MI (US); Martin Machill, Rietheim (DE); Philipp Bohnenstengel, Steisslingen (DE); Matthias Schweizer, Tuttlingen (DE)

(73) Assignee: Aesculap AG, Tuttlingen (DE)

( * ) Notice: Subject to any disclaimer, the term of this patent is extended or adjusted under 35 U.S.C. 154(b) by 30 days.

(21) Appl. No.: 18/143,699

(22) Filed: May 5, 2023

(65) Prior Publication Data

US 2024/0366473 A1 Nov. 7, 2024

(51) Int. Cl.

| | |
|---|---|
| ***A61J 1/14*** | (2023.01) |
| ***B65D 21/02*** | (2006.01) |
| ***B65D 45/18*** | (2006.01) |

(52) U.S. Cl.
CPC ........ *A61J 1/1425* (2015.05); *B65D 21/0209* (2013.01); *B65D 45/18* (2013.01)

(58) Field of Classification Search
CPC ............ B65D 21/0217; B65D 21/0224; B65D 21/0226; B65D 21/0209; B65D 57/005; B65D 45/18; A61J 1/1425
USPC ................. 206/503–513, 515–516, 518–519
See application file for complete search history.

(56) References Cited

U.S. PATENT DOCUMENTS

| | | | | | |
|---|---|---|---|---|---|
| 352,136 | A * | 11/1886 | Leach | A21B 3/135 | 220/4.21 |
| 823,415 | A * | 6/1906 | Krampitz | A47J 45/10 | 123/74 B |
| 1,219,969 | A * | 3/1917 | Lowe | B65D 25/32 | 220/756 |
| 1,355,332 | A * | 10/1920 | Hanson | A47J 45/071 | 99/422 |
| 1,838,754 | A * | 12/1931 | Frame | B65D 21/0224 | 211/126.11 |
| 2,135,401 | A * | 11/1938 | Kiff | B65D 21/0224 | 206/503 |
| 2,896,835 | A * | 7/1959 | Burkhardt | B65D 5/004 | 206/510 |
| 2,987,198 | A * | 6/1961 | Crane | B65D 5/004 | 410/121 |
| 3,026,008 | A * | 3/1962 | Bertram | B65D 5/004 | 229/178 |

(Continued)

FOREIGN PATENT DOCUMENTS

| | | | | |
|---|---|---|---|---|
| WO | WO-2020078745 A1 * | 4/2020 | | A61B 50/20 |
| WO | WO-2022114688 A1 * | 6/2022 | | |

*Primary Examiner* — Orlando E Aviles
*Assistant Examiner* — Brijesh V. Patel
(74) *Attorney, Agent, or Firm* — Christopher A. Rothe; CM Law

(57) ABSTRACT

A sterile container, in particular for medical use or storage of medical products or articles, includes a tray with an external base surface and a lid with an external top surface. At least one slide support element is attached to the tray or to the lid. The sterile container is stackable with a second sterile container that is identical to the sterile container. The slide support element acts as a spacer and slide rail to prevent direct contact between facing base surfaces and top surfaces when handling or stacking the sterile containers.

13 Claims, 16 Drawing Sheets

(56) References Cited

U.S. PATENT DOCUMENTS

| | | | | | |
|---|---|---|---|---|---|
| 3,082,906 | A * | 3/1963 | Reed | B65D 81/3407 | 220/573.1 |
| 3,118,563 | A * | 1/1964 | Suchodolski | B65D 21/0224 | 206/821 |
| 3,169,659 | A * | 2/1965 | Blackmore | B65D 21/062 | 206/506 |
| 3,273,747 | A * | 9/1966 | Kalz | A47J 36/10 | 220/772 |
| 3,420,401 | A * | 1/1969 | Maslow | A47J 45/07 | 220/759 |
| 3,421,656 | A * | 1/1969 | Asenbauer | B65D 21/062 | 206/506 |
| 3,648,849 | A * | 3/1972 | Harris | B65D 21/0224 | 211/126.5 |
| 3,842,991 | A * | 10/1974 | Koebel | B65D 57/003 | 206/595 |
| 3,900,106 | A * | 8/1975 | Cantales | B65D 21/064 | D34/7 |
| 4,227,642 | A * | 10/1980 | Ortel | B65D 5/004 | 206/510 |
| D275,643 | S * | 9/1984 | Petterson | D7/355 | |
| 4,496,053 | A * | 1/1985 | Crane | B65D 5/004 | 206/510 |
| 4,505,390 | A * | 3/1985 | Kirk, Jr. | A45F 3/16 | 215/396 |
| 4,804,092 | A * | 2/1989 | Jones | B65D 43/0212 | 229/125.17 |
| 4,947,992 | A * | 8/1990 | Schafer | B65D 21/062 | 206/506 |
| 5,056,424 | A * | 10/1991 | Lai | A47J 33/00 | 220/756 |
| D333,588 | S * | 3/1993 | Bergman | D7/332 | |
| 5,335,789 | A * | 8/1994 | Taravella | B65D 5/0055 | 229/199 |
| 5,384,103 | A * | 1/1995 | Miller | A61L 2/26 | 206/508 |
| 5,441,707 | A * | 8/1995 | Lewis | A61L 2/06 | 206/439 |
| 5,628,970 | A * | 5/1997 | Basile | A61L 2/06 | 206/363 |
| 5,722,540 | A * | 3/1998 | Laird | B65D 21/0224 | 206/821 |
| 5,896,987 | A * | 4/1999 | Bettenhausen | B65D 21/0223 | 206/370 |
| 6,116,452 | A * | 9/2000 | Hamel | B65D 45/20 | 220/345.2 |
| 6,827,913 | B2 * | 12/2004 | Wood | A61L 2/26 | 206/370 |
| 6,874,634 | B2 * | 4/2005 | Riley | A61B 50/30 | 206/439 |
| 7,341,148 | B2 * | 3/2008 | Bettenhausen | A61L 2/18 | 206/439 |
| 7,905,353 | B2 * | 3/2011 | Baker | B65D 1/28 | 206/370 |
| D662,761 | S * | 7/2012 | Wahl | D7/354 | |
| 8,490,810 | B2 * | 7/2013 | Lown | A47F 3/14 | 220/23.6 |
| 9,198,811 | B2 * | 12/2015 | Pizzato | A61F 17/00 | |
| D752,913 | S * | 4/2016 | Taylor | D7/354 | |
| D788,518 | S * | 6/2017 | Aggarwal | D7/360 | |
| 2010/0089151 | A1 * | 4/2010 | Mantilla | B65D 21/0233 | 220/759 |
| 2013/0105346 | A1 * | 5/2013 | Ramkhelawan | A61B 50/33 | 206/370 |
| 2015/0053696 | A1 * | 2/2015 | Borovicka | A47J 45/071 | 220/573.1 |
| 2016/0037965 | A1 * | 2/2016 | Lacaria | A47J 36/34 | 206/505 |
| 2020/0015631 | A1 * | 1/2020 | Singh | A47J 45/06 | |
| 2020/0108974 | A1 * | 4/2020 | Joseph | B65D 21/0233 | |
| 2022/0363437 | A1 * | 11/2022 | Black | B65G 57/005 | |

* cited by examiner

STERILE CONTAINER

FIELD

The disclosure relates to a stackable sterile container, in particular for medical use or storage of medical products or articles, comprising a tray with an external base surface and a lid with an external top surface.

BACKGROUND

Sterile containers or container systems are reusable sterile packaging which are used with a long product life cycle in everyday clinical practice. The vast majority of known sterile containers comprise an anodized aluminum tray and an anodized aluminum lid. The anodized layer forms a very thin but very resistant protective layer for the "soft" aluminum.

In the daily handling of sterile containers in the instrument cycle, it is common to stack containers, e.g. for transport or storage. In this case, the containers are loaded with up to 15 kg of sterile goods, mostly instruments.

When handling the sterile containers, they are pulled or pushed over surfaces such as tables, shelves or transport trolleys or over other containers. This causes scratches in the material surface of the container tray and container lid. In particular, the anodized aluminum deep-drawn bodies of the container tray and lid are very susceptible to scratching. In addition, impact points, abrasion, scratches, chips and other surface damage can occur during handling.

These scratches and other surface damage can not only cause visual defects in the aluminum components, but can also break through the protective anodized layer, resulting in an exposed aluminum layer. This can impair the protective function of the surface treatment. Pushing/pulling the components on top of each other also causes unwanted abrasion, such that material abrasion may penetrate into sterile environments.

In summary so far, disadvantages of known sterile containers include:

- Scratching of the components affects the appearance of the products. New products in particular already look badly battered after just a few cycles of use. The value of the sterile containers may be reduced by the impaired appearance.
- Partial destruction of the protective surface coating occurs.
- Anodizing or aluminum abrasion occurs, especially abrasion on container lids. This abrasion may cause discomfort in the operating room and the Central Sterile Services Department (CSSD) of a hospital or health care facility.

SUMMARY

An objective of the present disclosure is to provide a stackable sterile container of the above-described kind which overcomes at least one of the mentioned disadvantages of known solutions. In particular, a stackable sterile container shall be easy to manufacture and robust, such that in the daily handling a minimum of damages and visual impairment to the external surfaces of the tray and the lid occur. More specifically, one goal is to prevent the surface of the sterile containers from being scratched and damaged during the handling of sterile containers and especially of stacked sterile containers.

These and other goals are achieved by a stackable sterile container according to the present disclosure.

Hence, the disclosure suggests a stackable sterile container, in particular for medical use or storage of medical products or articles, comprising a tray with an external base surface and a lid with an external top surface, wherein at least one slide support element is attached to the tray or to the lid, and wherein said slide support element acts as a spacer and slide rail when handling or stacking said containers, such that a direct contact between facing base surfaces and top surfaces in a stack of such containers is prevented.

Throughout this disclosure, the terms 'tub' and 'tray' may be used interchangeably to denote a lower, in particular vessel-like, container part on which the 'cover' or 'lid' is placed as an upper container part to close the container.

The disclosure is based on the consideration that sterile container systems with plastic lids would solve some of the mentioned problems, but these have other disadvantages such as reduced durability compared to aluminum lids.

Furthermore, disposal containers made of stainless steel are known. However, these have a different function in comparison to sterile containers. Due to the much poorer formability as well as the higher weight and material costs, it is not possible or at least not practicable to manufacture a sterile container of interest here from stainless steel.

Therefore, the disclosure takes a different path and provides a (preferably retrofittable) slide support for sterile containers. At least one slide support element is attached to the tray or the lid. The purpose of these additional elements/the slide support is to prevent the surface of the sterile containers from being scratched and damaged during the handling of sterile containers and especially of stacked sterile containers.

In some cases a single slide support element attached/fixed to either the tray or the lid may be sufficient. In other cases several slide support elements attached to either the tray or the lid may be suitable. It is also possible that both the tray and the lid are equipped with a number of slide support elements. In general, each slide support element may be one-piece or multi-piece.

When stacking or handling sterile containers, the stacked container is placed on the slide support element and no longer on the lid or pushed over it, thus avoiding scratching of container lids and container trays. Since the slide support element may be made from a different material than the tray or the lid, a change of sliding and abrasion properties may be employed.

More specifically, the contour of the respective slide support element is preferably designed in such a way that it advantageously follows the contour of the lid (or tray) surface. This means that the slide support elements form sliding rails for the container tray on the container lid. The stacked container tray thus slides on the slide support element(s) when pushed or pulled over a container lid and no longer slides on the container lid surface. When stacked, the slide support elements act as spacers between the tray and the lid. The slide support elements are preferably designed in such a way that even when the tray (or tub) is handled at different angles (e.g. when pulling a container at an angle), it does not make contact with the container lid. Thus, the proposed solution provides a sliding support of the container tray on the lid and thus represents an (retrofittable) scratch protection for sterile containers.

Preferably, the tray and/or the lid is made of anodized aluminum which is lightweight yet robust and easily moldable. In principle, however, the disclosure works for other container materials as well.

The respective slide support element is preferably made of a material different from a (main) material of the tray and/or the lid. In particular, the slide support element may be made of metal, in particular stainless steel. Alternatively, slide support elements made of plastic are possible.

In one of the most preferred embodiments with an anodized aluminum tray and lid and a stainless-steel slide support element the sliding and abrasion properties change from anodized on anodized to anodized on metal. The stainless-steel slide support elements have a much harder and smoother surface than the rough anodized layer of the aluminum components, therefore the container slides over the slide support element(s) without significant abrasion.

While a fixed, inseparable fastening or even an integrated (single-piece) version is an option (see further below), the respective slide support element is preferably removably or replaceably attached to the tray or to the lid. In particular, the slide support element may be clamped or clipped to the tray or to the lid.

The respective slide support element can be inserted or hooked into lugs on the container lid, for example. This allows for simple assembly by the customer or user without tools. The slide support element is held in the mating geometry via geometry (positive locking) or via a pretension of the slide support element.

In the case of a filter area within the lid, with the filter comprising a perforation, it is also possible to fasten a slide support element in said perforation of the filter area (fastening elements for this purpose are designed in such a way that the filters are not damaged). In particular, the slide support element may be clamped into a number of perforation holes in the lid.

In another preferred design variant the respective slide support element is stretched/guided/placed over the lid and hooked/clamped under two opposing edges of the lid or under two undercuts within the lid.

In yet another preferred design variant the slide support element is clamped into a number of latches associated with a lid closure or lid fastener integrated into the lid.

The different attachment or fastening solutions for the slide support element may be combined with each other.

In a preferred configuration the slide support element rests on the base surface of the tray or the top surface of the lid over an extended section or at a plurality of short (in comparison to the lateral extension of the tray or lid) sections. In other words, the slide support element is preferably designed to follow the contours of the lid (or tray) and uses these as additional support.

In order to act as a spacer, the slide support element preferably protrudes from the base surface of the tray or the top surface of the lid.

In a particularly advantageous embodiment the respective slide support element comprises or consists of a bracket or stirrup, preferably a metal (e.g. stainless steel) bracket or stirrup. In particular, the bracket or stirrup may comprise a substantially oval or polygonal, in particular O-shaped or rectangular, wire loop or frame and a hook/connector/fastening portion. As already mentioned, the hook may engage with a geometric feature or receptable of the tray or the lid.

In order to provide a protection over as large an area as possible, the bracket or stirrup preferably extends essentially over a total longitudinal or lateral extent of the tray or the lid.

In another preferred embodiment the slide support element comprises or consists of a plate or stripe, which preferably forms a (preferably flat) cover on the base surface of the tray or the top surface of the lid. This may be realized as an alternative to a bracket/stirrup or combined with it. Advantageously, the cover plate or stripe may be made of plastic or metal. Such a solution may be seen in analogy to (inverted) furniture glide pads.

In an advancement of the basic idea, the slide support element comprises a label. This is particularly useful for a slide support element made of plastic but in principle also possible for metal versions. In particular, by using different colors and/or different labeling options (e.g., brand name, clinic name, surgical discipline, etc.), the large lid surface and the slide support element can be used as an additional labeling element.

In particular, one can use the slide support element as an additional labeling element, especially for large labels like paper sheets. In the slide support element labels like laser marking or identification tags can be used. Slide support elements in different colors can be used as additional labeling element, to differentiate the sterile containers by colors. Color coding of sterile containers as such is well-known and advantageous in hospitals to code different medical indications, or to which clinic containers belong (e.g., when a sterile goods reprocessing department is serving different clinics).

The standard DIN EN 868-8-Annex E defines the so-called stacking test as a requirement for sterile containers. The test requires that stacked sterile containers must withstand a minimum force of 40 N when pulled horizontally on top of each other. The geometric design of the slide support can support the achievement of the normative required forces. For example, an otherwise flat bracket or stirrup may comprise corners or end portions turned upwards (facing away from the base surface of the tray or the top surface of the lid).

Hence, in slightly different words, the slide support element can support normative requirements, such as the stacking tension test according to DIN EN 868-8. Here it is specified that stacked containers require a certain force to be moved in the stacked state. Sliding of containers on top of each other and/or safe stacking of container on container can be supported by the slide support element or achieved by it alone.

As mentioned before, slide support elements may be realized as permanently installed elements, for example as fixed brackets, rails, runners, supports, plates or similar that are attached to the container lid or container floor/tray. These are preferably attached in the region of the contact points of two containers and are, however, not easily replaceable by the customer (e.g., disguised as lettering/design element/colored marking).

Certain containers may have aluminum bodies for fixing the metal frame in the lid, which holds the seal. On the inside of the lid, these are plastically deformed like rivets. On the upper side (outside) of the lid these elements form aluminum stacking aids fixed in the corners. The container tubs of the mini and dental containers have embossments in the tubs, which interact with the aluminum rotating bodies of the lid.

More specifically, the fastening rivets of the lids of certain containers like dental containers may form a riveted joint inside the container, and on the outside of the lid a contour for stacking the containers. The rivets are also made of aluminum. In order to obtain a better sliding pair, rivets made of stainless steel or plastic are advantageous. The elements of the mini and dental containers are turned parts.

It is advantageous to use elements whose shape also allows containers to slide on the lids and cover larger areas of the lid and protect it from damage to the surface. As an alternative to the fastening concept of mini and dental containers, elements can also be inserted by clinch joints. In clinch joints, the aluminum material of the lid is formed through the inner sheet for fastening. It is known that inserts can also be used for clinching as a pressing tool. These inserts can form slide elements which are designed for stacking and slide support for containers.

Next to using dedicated additional elements as slide support elements, slide support elements can also be formed by improving and/or changing and/or adapting existing parts of sterile containers. Especially in some embodiments sterile container lids are mounted with rivets. Also aluminum stacking devices may be mounted on those container lids. In this case, a slide support can also be provided by changing the material of these elements from anodized aluminum to stainless steel or plastic. By changing the material of existing parts the friction coupling can be improved without additional parts.

The friction pairing between the lower and upper sterile containers in a stack can also be improved by means of a coating. In addition and/or as an alternative to the anodized coating, the sterile containers can be given further coatings which improve the sliding pairing between the lid and the tray (slip support through coating). In the case of both the lid and the container tray, the complete elements or preferably just the product areas subject to high stress can be modified by a coating in order to prevent damage during handling and when the containers slide over one another.

In summary, the following objectives are met by the disclosure:

- Provision or slip/slide support for sterile containers to reduce scratching of the container tray and container lid when handling containers, in particular when stacking containers on containers.
- High-quality impression. The container is preserved by the absence of scratching of the components which contributes to the careful handling of the products.
- Avoidance of damage to the anodized layer
- Reduction/elimination of abrasion
- The solution is optional and can be retrofitted at the customer's site.
- The system can preferably be assembled and disassembled by the customer or user, preferably without tools.
- Achievement/support to fulfill the stacking test according to standardization regulations or normative requirements, in particular DIN EN 868-8, appendix E.

BRIEF DESCRIPTION OF THE DRAWINGS

Exemplary embodiments of the disclosure are illustrated in the accompanying schematic drawings, wherein.

DETAILED DESCRIPTION

Figure 1:
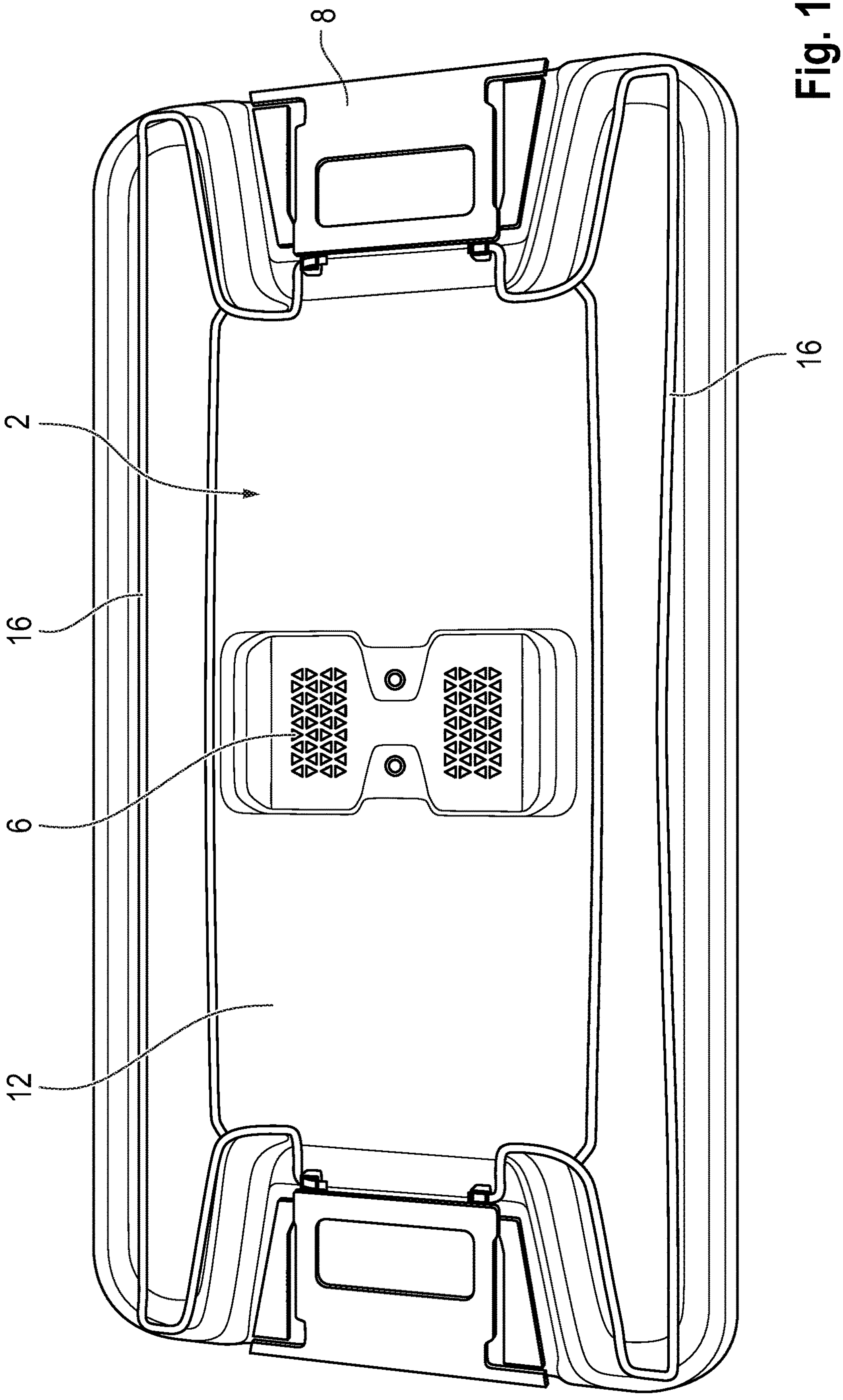
FIG. 1 shows a top view of a lid of a sterile container according to the disclosure with two slide support elements according to a first major embodiment attached and with a closure element in closed (locking) position.
Figure 15:
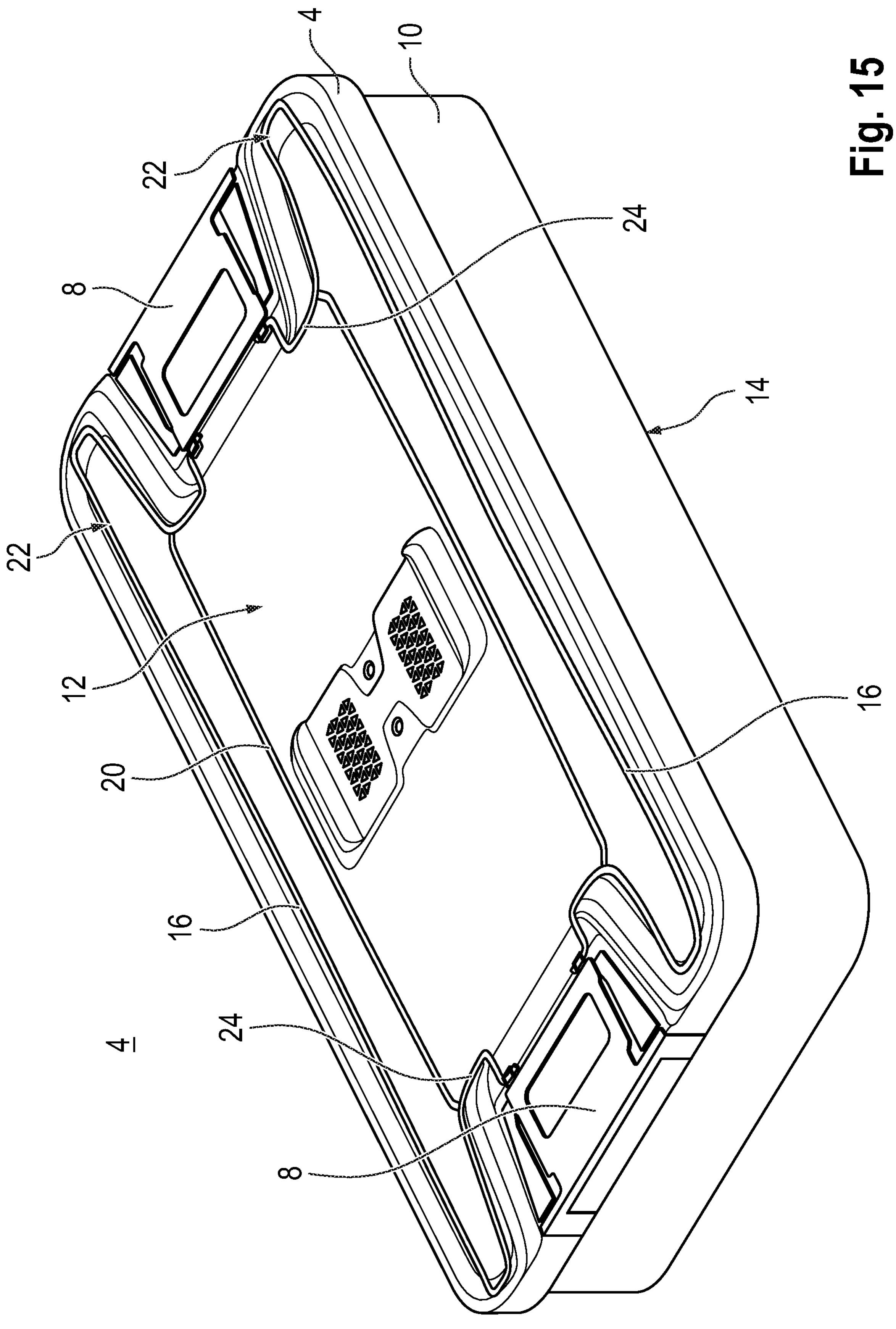
FIG. 15 shows a perspective view from above of a sterile container according to the disclosure with a number of slide support elements attached.
Figure 16:
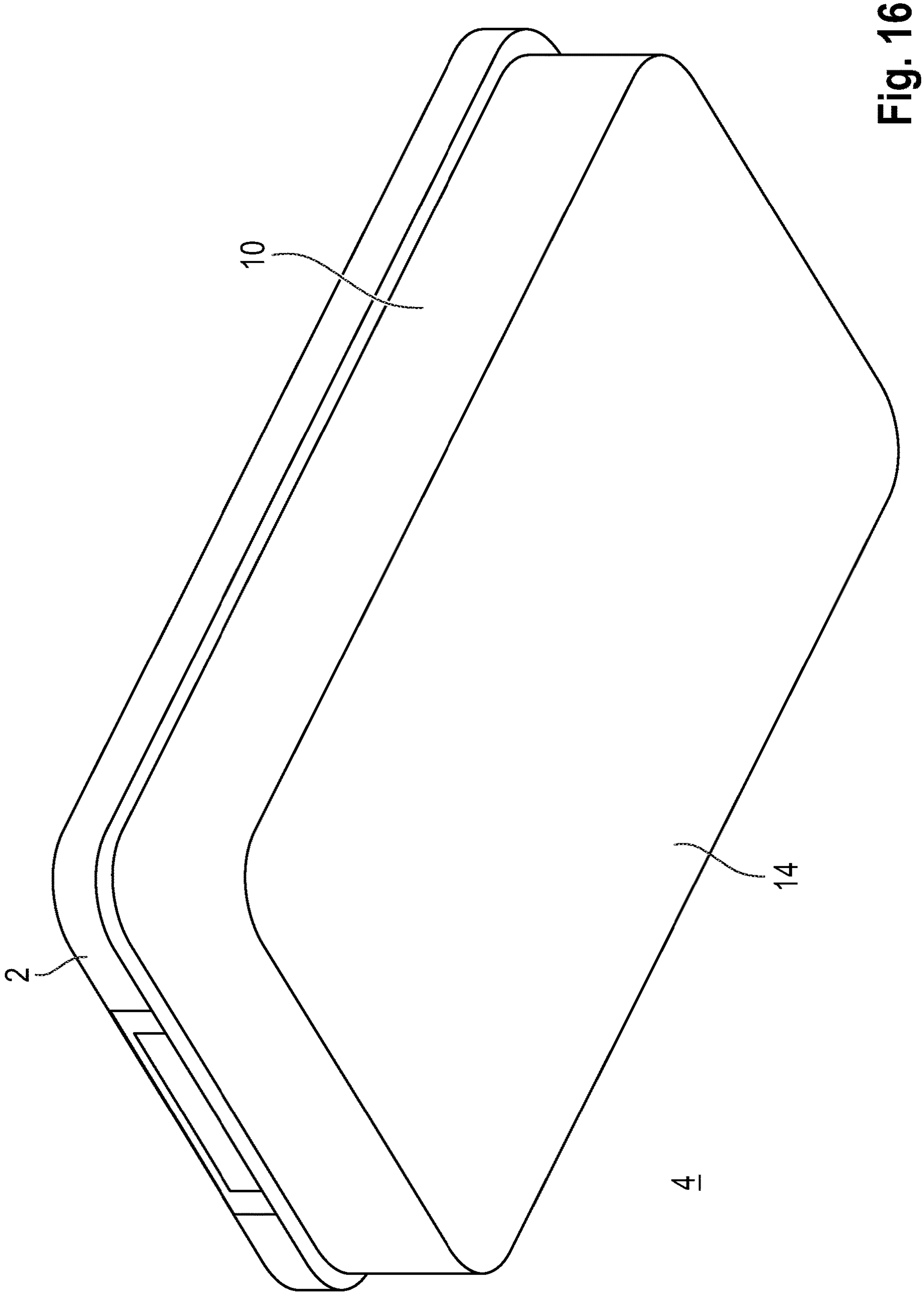
FIG. 16 shows a perspective view from below of the sterile container from FIG. 15.

FIG. 1 shows a lid 2 of a stackable sterile container 4 for medical applications in a top view. In the example the lid 2 has a rectangular outline with a longitudinal direction and a transverse direction. In the center there may be a filter area with a plurality of perforation holes 6. In each of the edge regions of the two smaller sides there is a tiltable fastener or closure element 8 with the help of which the lid 2 may be locked to a tub or tray 10. The whole container 4 with the lid 2 placed on the tray 10 is shown in FIGS. 15 and 16. In the example the walls of the tray 10 are made of anodized aluminum, and so are the main wall portions of the lid 2 (the closure elements 8 or parts thereof and various inserts inside the container 4 may be made of different materials). That means the (upper) external top surface 12 of the lid 2 and the (lower) external base surface 14 of the tray 10 are protected by an anodized coating or layer which however is quite sensitive to mechanical impacts, scratches, and the like.

In order to protect the container 4 against such damage and deterioration which could otherwise occur during handling, in particular when stacking one container 4 on another, the stackable sterile container 4 is equipped with a protection which in the example comprises two alike (here: even identical) slide support elements 16, each of them attached to the lid 2 and placed on its top surface 12. Each of the slide support elements 16 acts as a spacer and slide rail when handling or stacking said containers 4, such that a direct contact between facing base surfaces 14 and top surfaces 12 in a stack of such containers 2 is prevented or at least reduced.

Figure 4:
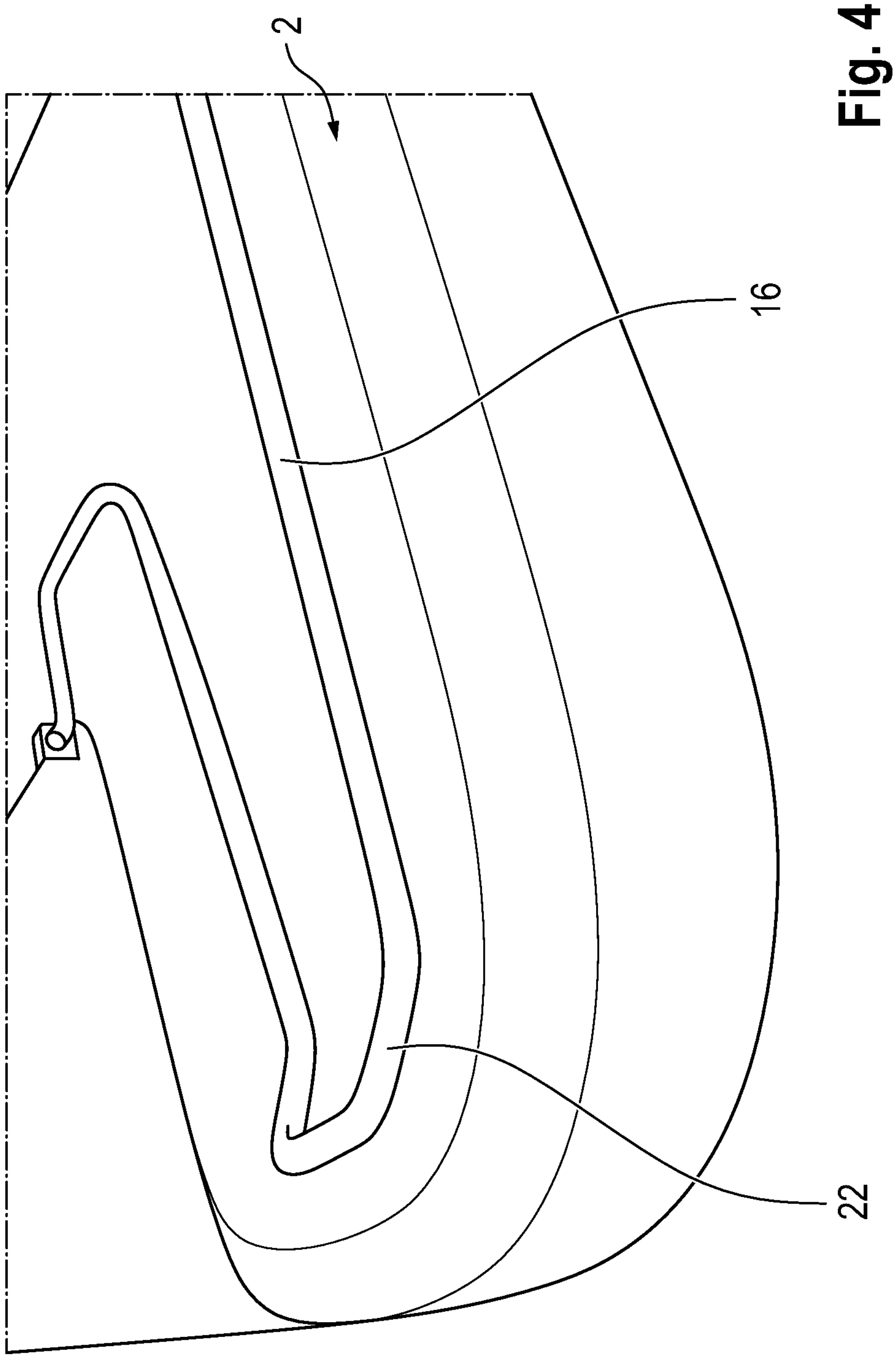
FIG. 4 shows another detail view of the lid and one of the slide support elements.
Figure 5:
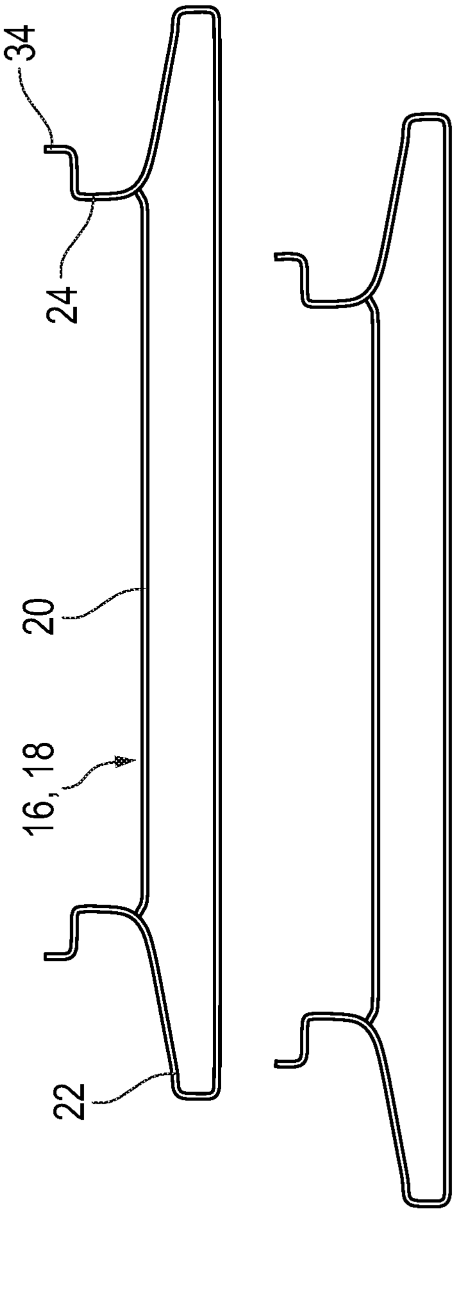
FIG. 5 shows the two slide support elements from FIG. 1 separated from the lid and arranged side by side in a top view.

More specifically, in the example the respective slide support element 16 consists of a wire bracket 18 or stirrup made of stainless steel which roughly resembles a coat hanger, as illustrated in FIG. 5 where the two brackets 16 are shown isolated, without the lid 2. Each bracket 18 comprises a polygonal stainless-steel wire frame 20 lying substantially in one plane, with exception of the upwardly inclined end regions 22 (also see FIG. 4). When attached to the lid 2 as in FIG. 1 the bracket 18 extends longitudinally along substantially the entire length of the lid 2. The plane of the central portion of the bracket 18 is parallel to the top surface 12 of the lid, i.e. the bracket 18 lies essentially flat on the lid 2, however protruding slightly upwardly from the top surface 12 and resting on it at least at a number of contact points or regions. If like in the example, the top surface 12 has an elevation profile with some elevations, at least the most elevated portions of the bracket 18 (here: the inclined end regions 22) exceed or overlook the most elevated portions of the top surface 12.

Figure 2:
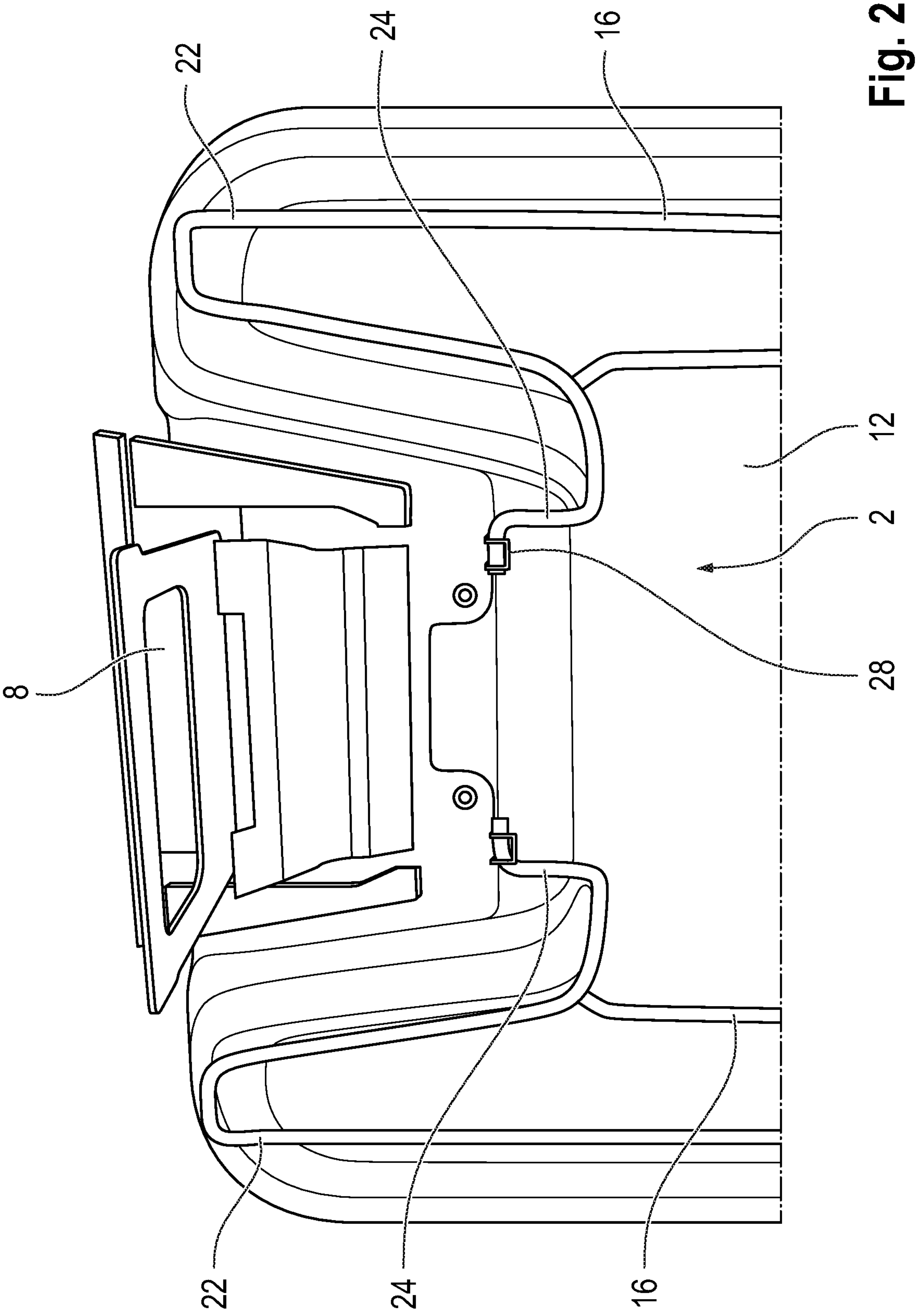
FIG. 2 shows a detail cutout of FIG. 1 with the closure element in open (unlocking) position.
Figure 3:
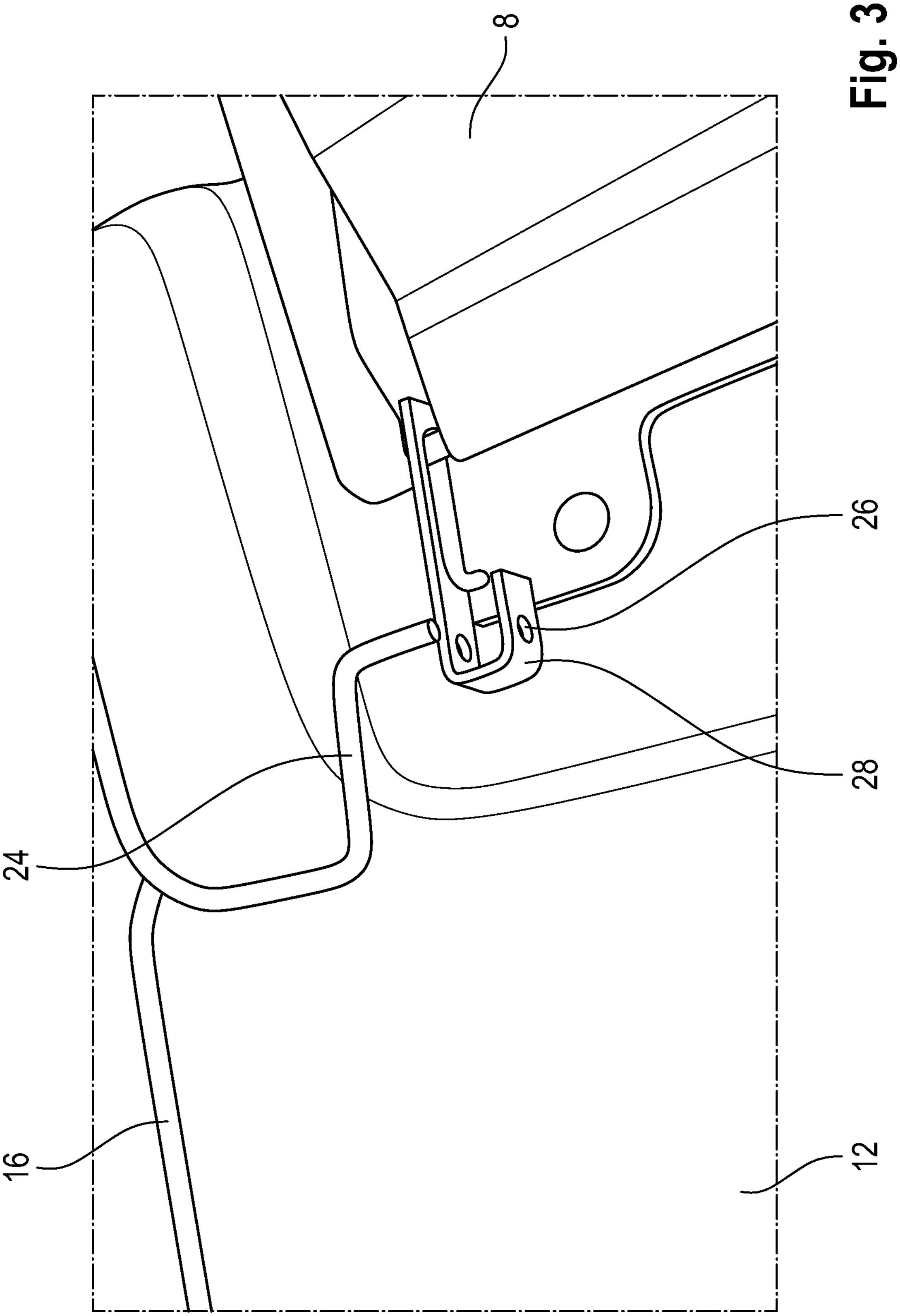
FIG. 3 shows a further detail cutout of FIG. 1 with one of the slide support elements in a temporary position before attachment to the closure element.

In the example the respective slide support element 16 is attached to the lid 2 via two wire hooks 24/thorns/spikes or similar connection elements, each of them protruding from the central frame portion and being inserted into a corresponding eyelet 26 of a latch 28 or lug attached to the opening mechanism of one the closure elements 8. This can be seen in more detail in FIG. 2 and FIG. 3, wherein in the latter connecting end portion of the hook 24 is shown just before insertion into the eyelet 26. Preferably, the brackets 18 are clamped into the latches 28 or lugs with pretensioning. In an alternative version the brackets 18 may be hooked into counterparts in the closure element 8 by means of a form fit.

In the given example of FIG. 1 to FIG. 5 the two identical slide support elements 16 are arranged symmetrically along the longitudinal sides of the lid 2. The slide support elements 16 can be designed as two separate elements as shown in the illustrations. Likewise, a common bracket/stirrup/formation and more than two elements in further forms of formation are possible. This is also true for the embodiment of FIG. 6, however the attachment of the slide support elements 16 to the lid 2 is different, as explained hereinafter.

Figure 6:
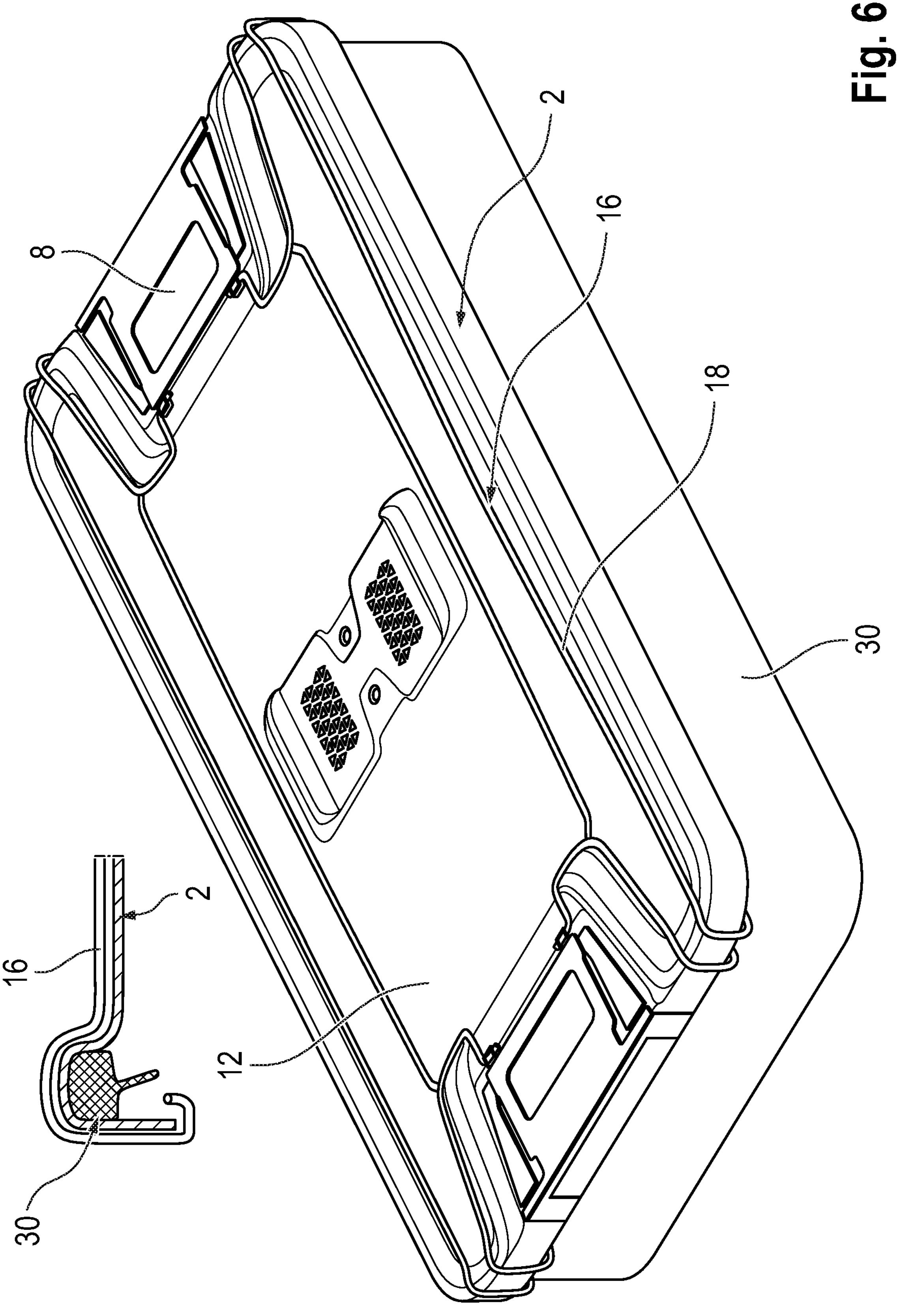
FIG. 6 shows a perspective view of a lid of a sterile container with two slide support elements according to a second major embodiment attached, and a detailed cross-section of one of the slide support elements reaching around an edge of the lid.

In the case of FIG. 6 the respective slide support element 16, preferably comprising a wire bracket 18, is designed to be hooked under the edge 30 of the container lid 2 instead of being clamped in the closure element 8. The protective wire frames are "stretched" over the lid 2, hooked under the edge 30 of the lid 2 on the first lid side and snapped in under the edge 30 of the lid 2 on the opposite lid side.

Figure 7:
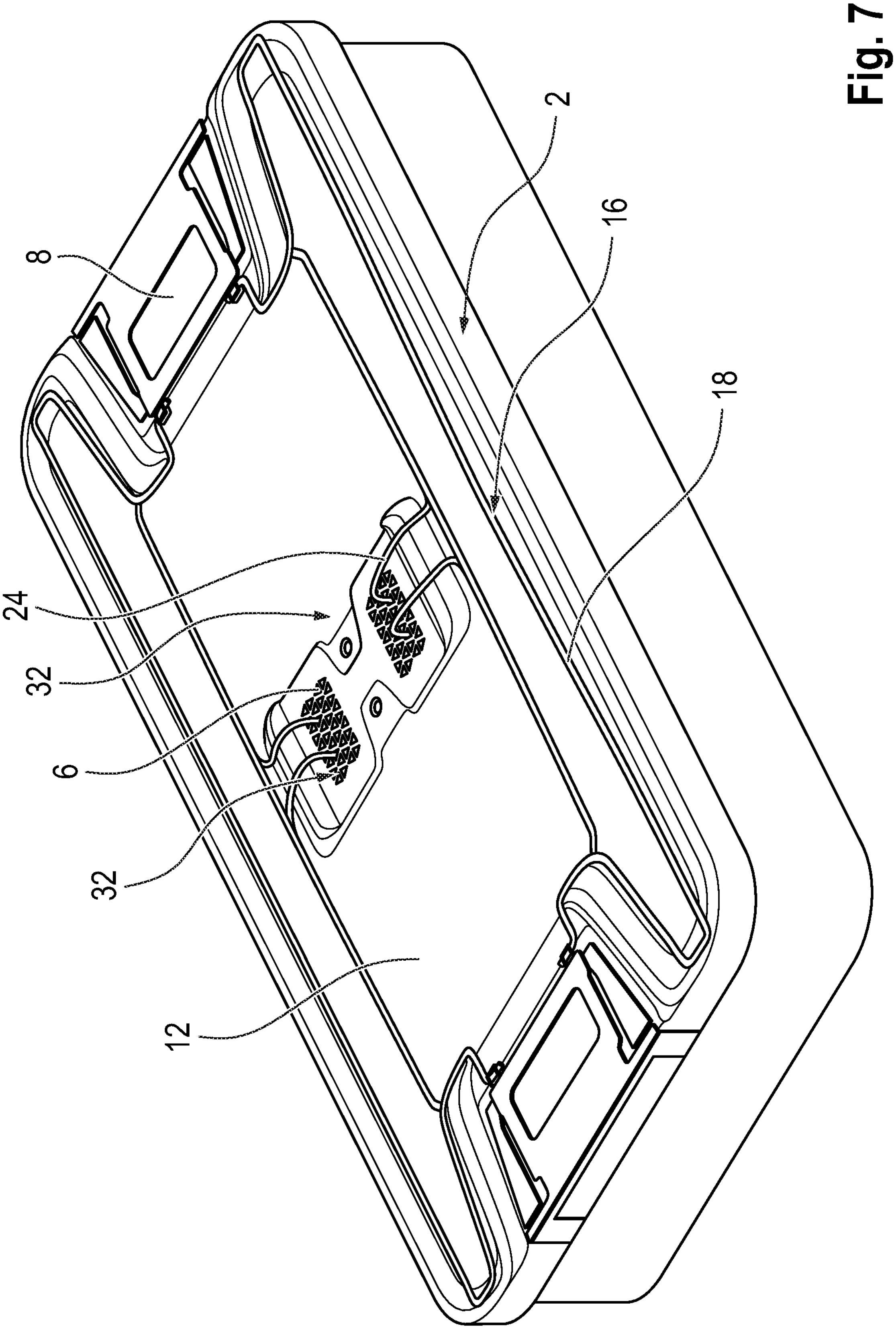
FIG. 7 shows a perspective view of a lid of a sterile container with two slide support elements according to a third major embodiment attached, here clamped to perforation of a filter area within the lid.
Figure 8:
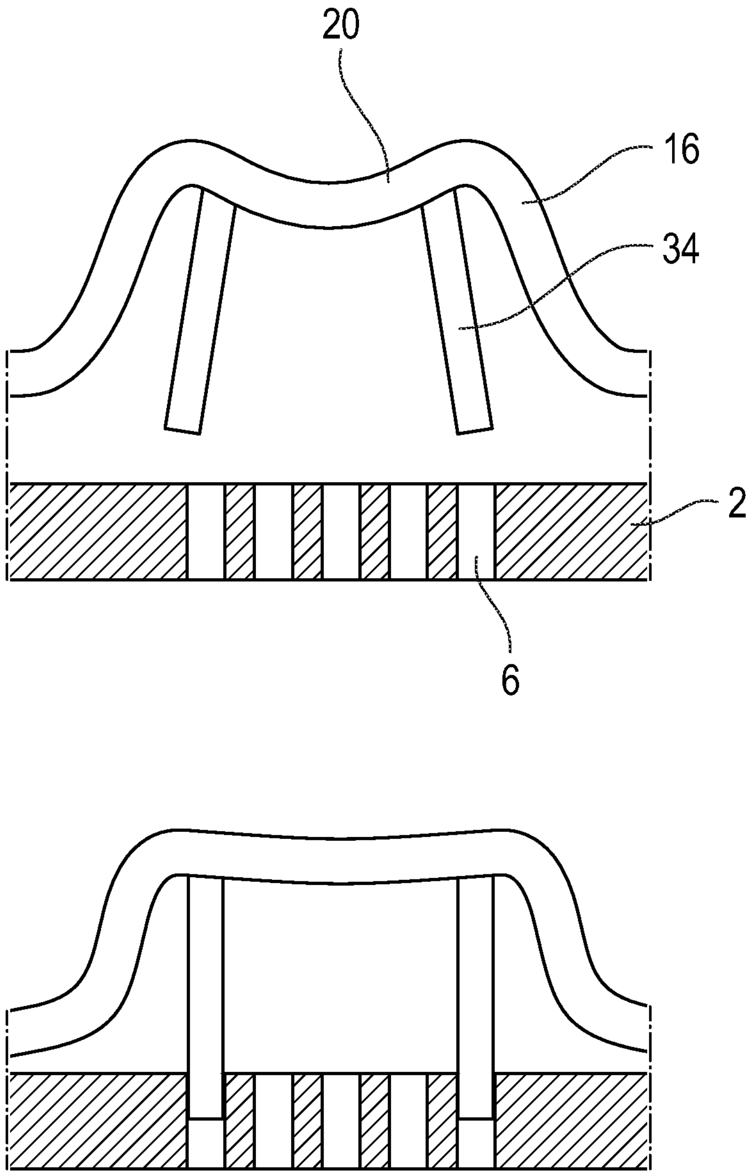
FIG. 8 shows attachment details with respect to FIG. 7 in cross-section (before and after attachment of a slide support element)

In the embodiment of FIG. 7 the respective slide support element 16 is fixed in the perforation 32 of the lid 2 (without damaging the perforation of the filter thereunder) via wire hooks/thorns/spikes or similar connection elements 34 protruding from the main wire frame 20 which acts as a spacer and sliding rail. FIG. 8 illustrates how in this case pretensioning of the slide support element 16 can lead to a reliable clamping of the connection elements 34 in the associated perforation holes 6.

Figure 9:
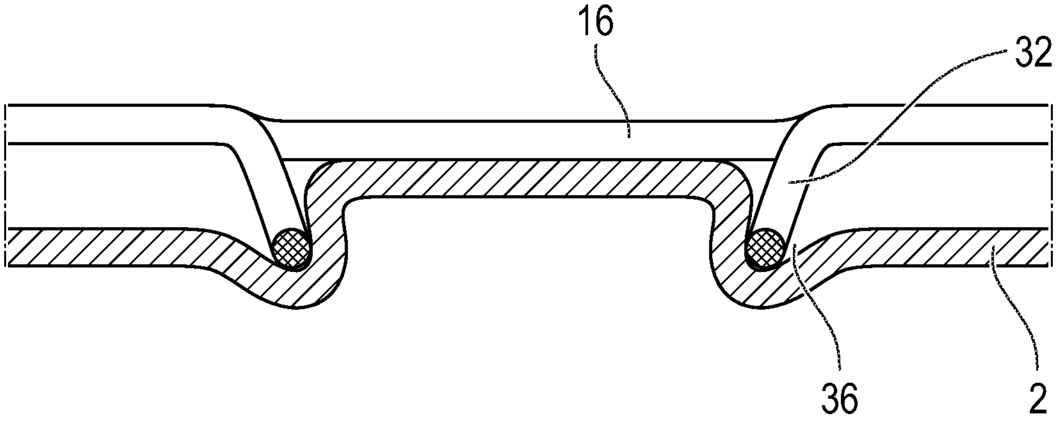
FIG. 9 shows another possibility of attachment in cross-section.

Turning to FIG. 9, an optional plastic perforation field cover may be available for certain container types. In a typical configuration this perforation field cover is attached via an undercut geometry in the center of the container lid 2 and is clicked/snapped/clamped into the undercut 36. The slide support elements 16 can also be fastened via this geometry. For this purpose, the slide support element 16 is clicked into the undercut 36 in a similar way to the perforation field cover, as illustrated schematically in FIG. 9.

Figure 10:
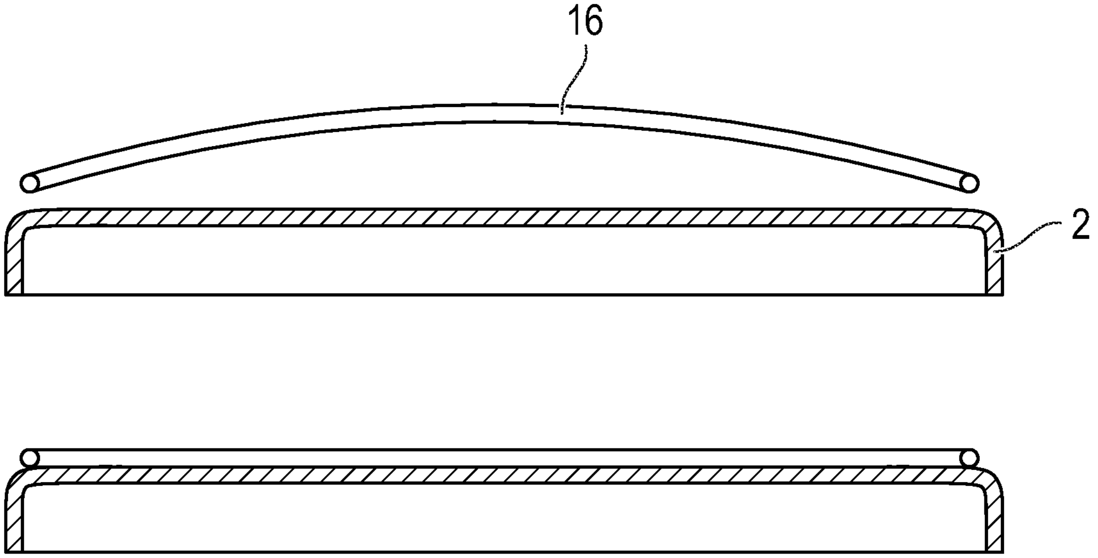
FIG. 10 illustrates the concept of pre-tensioning of a slide support element prior to attachment to a lid.

To prevent the slide support element 16 from wobbling or rattling, it can be designed in a pre-tensioned version so that it is pressed pre-tensioned onto the lid 2 during assembly and thus always rests on the lid 2. This concept is illustrated schematically in FIG. 10.

Figure 11:
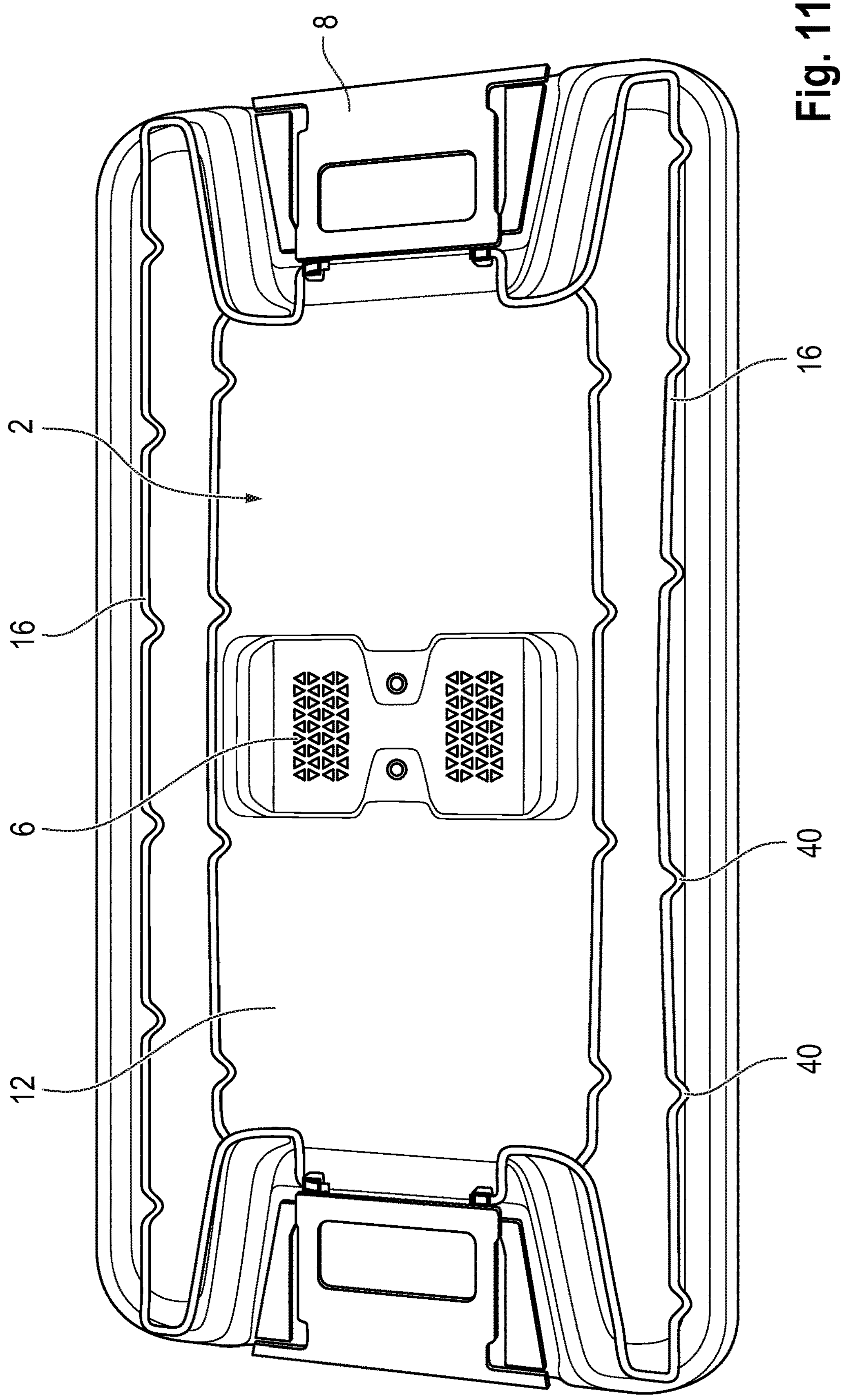
FIG. 11 shows a variation of two slide support elements attached to a lid of a sterile container.

As an alternative to design variants that rest directly on the lid 2, variants are also possible that create a gap between the slide support element 16 and the lid 2 due to their design. This allows a defined gap between the lid 2 and the slide support element 16, which facilitates cleaning and flushing of the system. In this spirit, FIG. 11 schematically illustrates an example where the wire frames of the slide support elements 16 rest on the lid surface only at a number of dedicated connection or support points 40 or regions via corresponding supports or bends in the wire frames.

Figure 12:
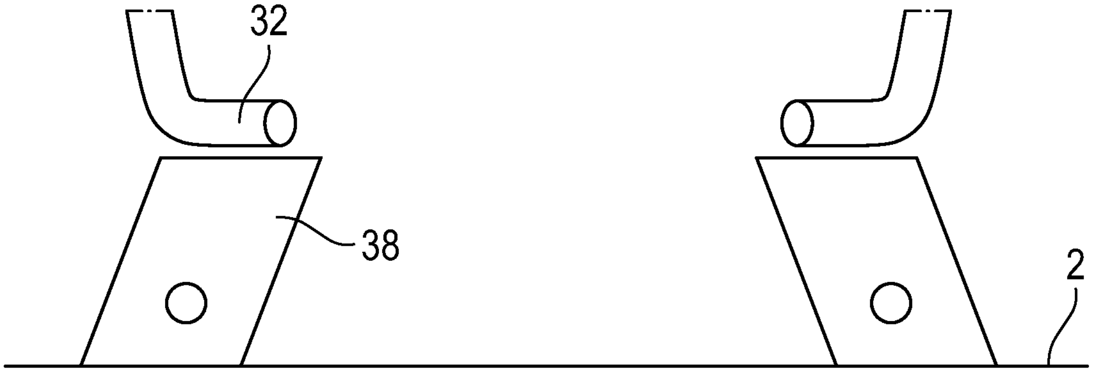
FIG. 12 shows a detail in connection with a possible attachment process.

For the various clamping attachments in order to be able to hook in the connection elements 34 of the respective slide support element 16 once and without tools, the connection elements 34 may be guided over an inclined surface of an associated mounting element 38. For mounting, the slide support element 16 is pressed down and spread elastically by the inclined surface until the connection elements 34 snap into the corresponding openings. This concept is illustrated schematically in FIG. 12.

Figure 13:
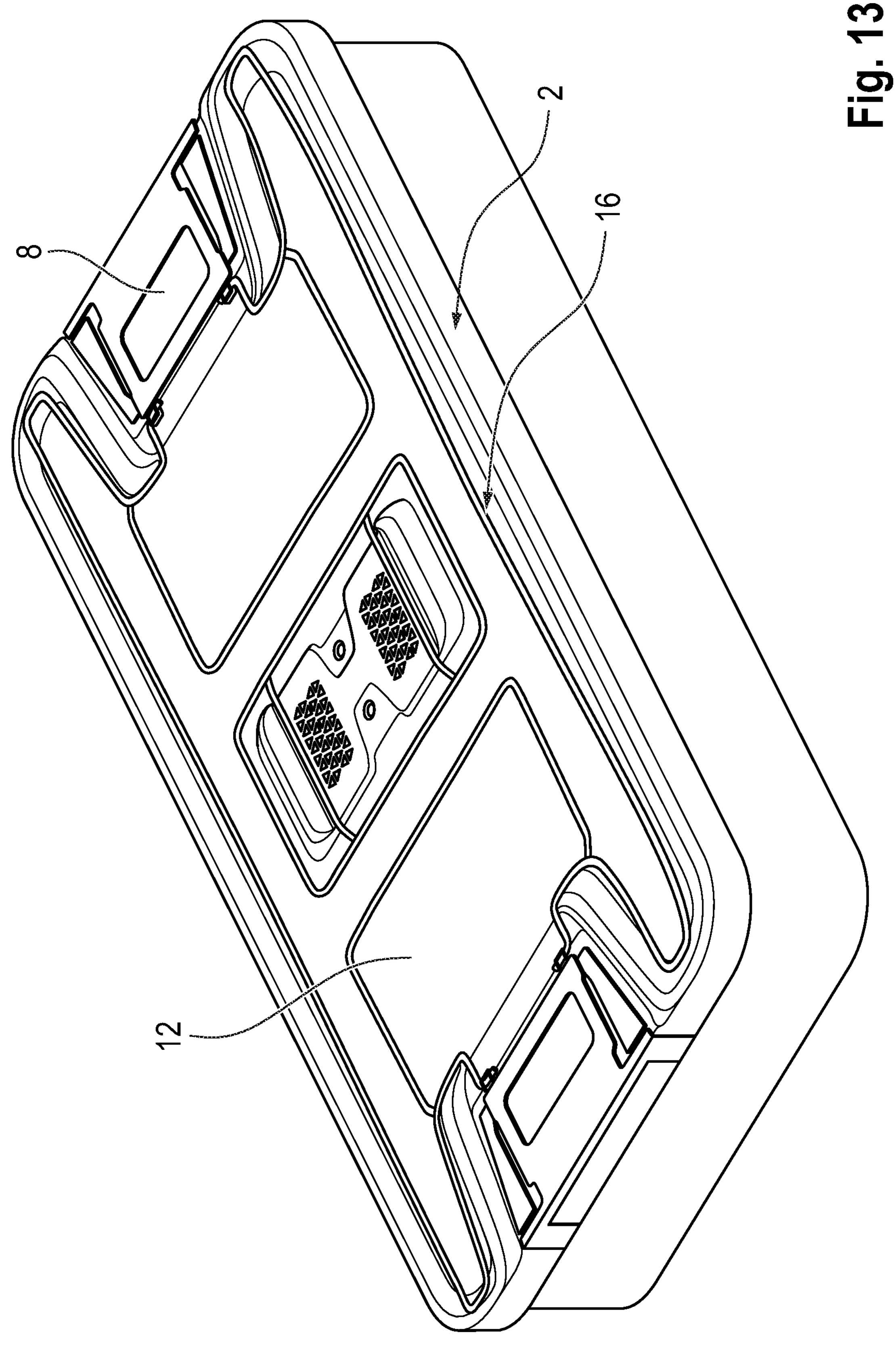
FIG. 13 shows a perspective view of a lid of a sterile container with a slide support element according to a fourth major embodiment attached.
Figure 14:
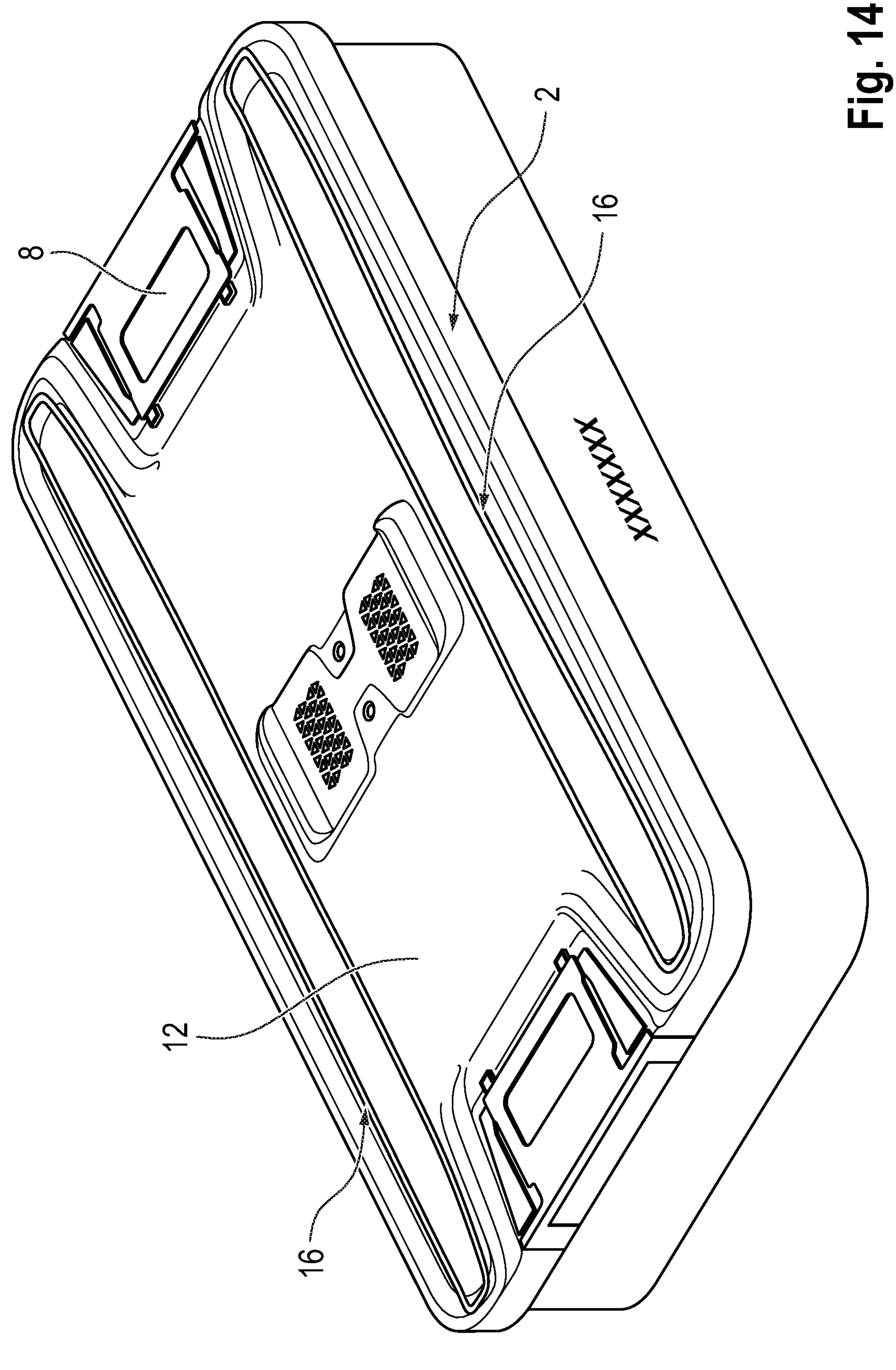
FIG. 14 shows a perspective view of a lid of a sterile container with a slide support element according to a fifth major embodiment attached.

Instead of or in addition to metal slide support elements 16, in particular based on wire frames or brackets 18, plastic slip or slide support elements 16 are possible. In particular, these elements can be flat plastic covers, for example in the shape of plates or stripes or more complex geometries. Examples are shown in FIGS. 13 and 14. Any method of attachment described in connection with metallic slide support elements 16 may also be applied to plastic slide support elements 16. Again, one-piece or multi-piece versions are possible. The slide support element 16 may be available as surface-mounted or floating version (floating with defined cleaning gap), and the plastic surface can be perforated for better cleanability. In addition, a plastic element can also be used, for example, as a labeling element. The labeling or inscription may be an embossing or an imprint, for example.

While the foregoing description has focused on slide support elements 16 attached to the lid 2 of a container 4, they may alternatively or additionally be attached to the tray 10 to protect the base surface 14 as well.

Figure 17:
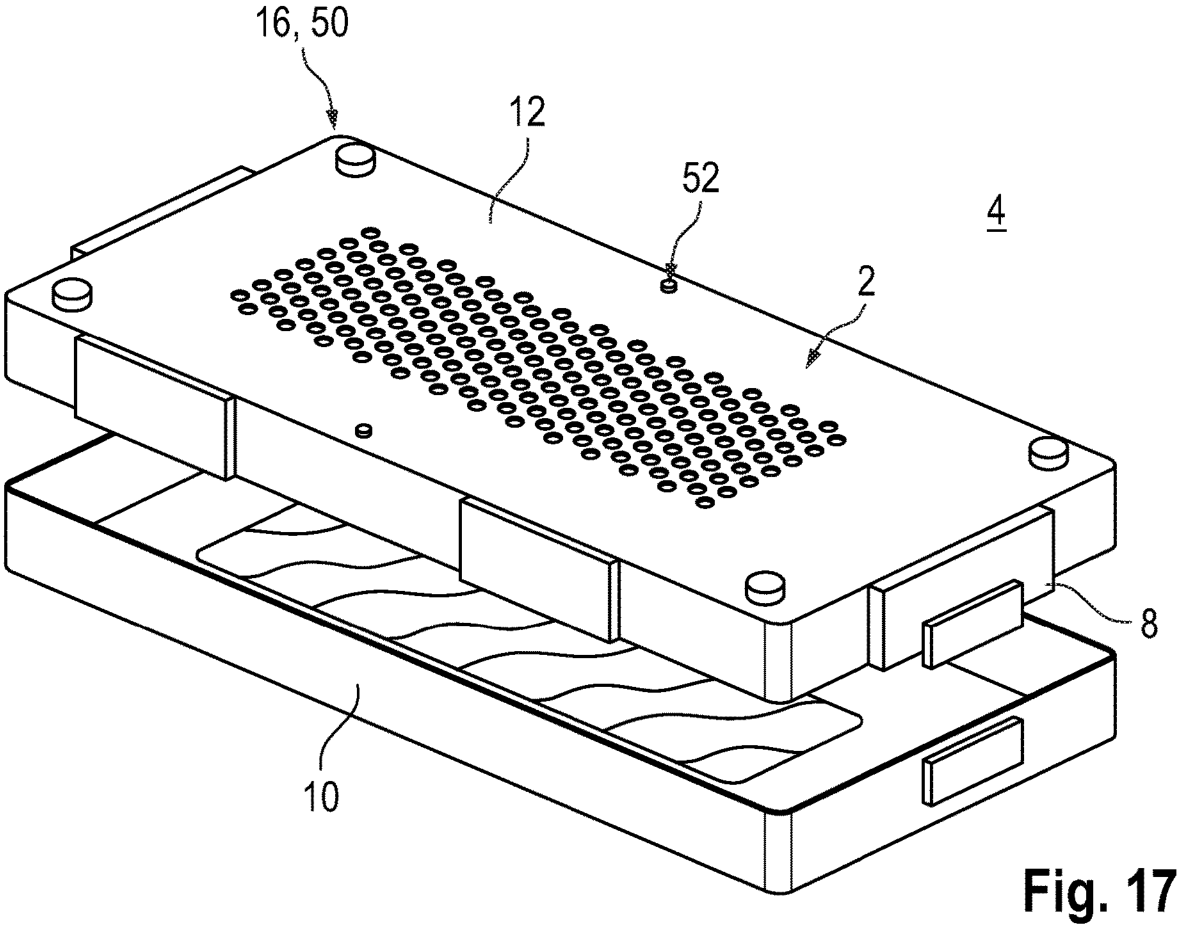
FIG. 17 shows another embodiment of a sterile container according to the disclosure in perspective view from above.

FIG. 17 shows another embodiment of a sterile container 4 according to the disclosure in a perspective view from above. In the example, the lid 2 of the container 4 comprises four cylindrical stacking elements 50, each of them arranged in a corner region of the lid 2 and protruding upwardly. The stacking elements 40 are preferably made of stainless steel and act as slide support elements 16, as described before. The same may be true for a number of rivets 52 arranged in the top surface 12 of the lid 2.

The invention claimed is:

1. A sterile container comprising: a container base with an external base surface;

a lid with an external top surface, wherein the lid is configured to secure to the container base with the external top surface facing away from the container base; and at least one slide support element attached to the container base or to the lid, the sterile container being stackable with a second sterile container identical to the sterile container, the at least one slide support element acting as a spacer and a slide rail to prevent direct contact between facing external base surfaces and external top surfaces when handling or stacking the sterile container with the second sterile container, and wherein the at least one slide support element is clamped into a number of latches associated with a lid closure element or lid fastener.

2. The sterile container according to claim 1, wherein at least one of the container base and the lid is made of anodized aluminum.

3. The sterile container according to claim 1, wherein the at least one slide support element is made of a first material, and at least one of the container base and the lid is made of a second material that is different from the first material.

4. The sterile container according to claim 1, wherein the at least one slide support element is made of metal or plastic.

5. The sterile container according to claim 1, wherein the at least one slide support element is removably or replaceably attached to the container base or to the lid.

6. The sterile container according to claim 1, wherein the at least one slide support element is clamped to the container base or to the lid.

7. The sterile container according to claim 1, wherein the at least one slide support element is clamped into a number of perforation holes in the lid.

8. The sterile container according to claim 1, wherein the at least one slide support element is stretched over the lid and hooked under two opposing edges of the lid or under two undercuts within the lid.

9. The sterile container according to claim 1, wherein the at least one slide support element rests on the external base surface of the container base or the external top surface of the lid over an extended section or at a plurality of short sections.

10. The sterile container according to claim 1, wherein the at least one slide support element comprises or consists of a bracket or a stirrup.

11. The sterile container according to claim 10, wherein the bracket or the stirrup comprises a oval or polygonal wire frame and a hook.

12. The sterile container according to claim 10, wherein the container base or the lid extends a first length in a first direction and a second length in a second direction that is perpendicular to the first direction, the first length is greater than the second length, and the bracket or the stirrup extends along the first direction.

13. The sterile container according to claim 1, wherein the at least one slide support element comprises or consists of a plate or a stripe.

* * * * *